(12) United States Patent
Fischer

(10) Patent No.: US 11,273,581 B1
(45) Date of Patent: Mar. 15, 2022

(54) METHOD AND TOOLING FOR CENTERING AND SHAPING AN IRREGULARLY SHAPED OBJECT

(71) Applicant: John G. Fischer, Irving, TX (US)

(72) Inventor: John G. Fischer, Irving, TX (US)

(73) Assignee: Tooth Fairy Designs, Inc., Irving, TX (US)

( * ) Notice: Subject to any disclaimer, the term of this patent is extended or adjusted under 35 U.S.C. 154(b) by 564 days.

(21) Appl. No.: 16/047,415

(22) Filed: Jul. 27, 2018

Related U.S. Application Data

(60) Provisional application No. 62/537,866, filed on Jul. 27, 2017.

(51) Int. Cl.
| | |
|---|---|
| *B29C 33/12* | (2006.01) |
| *A44C 17/04* | (2006.01) |
| *A44C 17/00* | (2006.01) |
| *B29C 33/44* | (2006.01) |
| *A61C 19/00* | (2006.01) |

(52) U.S. Cl.
CPC ............ *B29C 33/12* (2013.01); *A44C 17/007* (2013.01); *A44C 17/043* (2013.01); *B29C 33/44* (2013.01); *A61C 19/008* (2013.01)

(58) Field of Classification Search
CPC ................................ B29C 33/12; B29C 33/44
See application file for complete search history.

(56) References Cited

U.S. PATENT DOCUMENTS 8,789,251 B2 * 7/2014 Labow ................... A44C 17/02
29/10

* cited by examiner

*Primary Examiner* — James Sanders

(57) ABSTRACT

A center-cast tool for casting a non-uniform object is provided. The center-cast tool has a body having a casting bay recessed into the top side of the body. A base forms the bottom of the casting bay. First and second apertures extend through the base and the bottom side. The second aperture intersects the first aperture in perpendicular orientation to the first aperture to form an aperture intersection. The aperture intersection forms four opposing right angles on the base at the center of the bay. The distance between adjacent right angles in the base is equal to the length of each side of the bezel of a jewelry article into which the finish machined irregular object will be set. In another embodiment, a first release hole extends through the base and the bottom side on a first side of the aperture intersection.

14 Claims, 3 Drawing Sheets

METHOD AND TOOLING FOR CENTERING AND SHAPING AN IRREGULARLY SHAPED OBJECT

CROSS-REFERENCES TO RELATED APPLICATIONS

This application claims the benefit of U.S. Provisional Application No. 62/537,866 filed Jul. 27, 2017, which application is hereby incorporated herein by reference, in its entirety.

BACKGROUND

Technical Field

The disclosed method and tooling locates positions for machining surfaces on an irregularly shaped object to optimize the yield and appearance quality of a structured object from the irregularly shaped object. More particularly, the disclosed method locates positions for machining surfaces on an irregularly shaped object to optimize the position of one unmachined surface of the irregularly shaped object. The disclosed method and tooling is particularly useful for processing an exfoliated baby tooth into a cubic geometry with one unmachined surface for positioning in a jewelry article with the unmachined surface displayed. Most particularly, the disclosed method and tooling locates positions for machining surfaces on an irregularly shaped object to optimize the position of one unmachined surface of the irregularly shaped object, such that the four corners on intersection of machined and unmachined surfaces are most evenly selected.

DESCRIPTION OF RELATED ART

None

Background Information

Jewelry made from the bones and teeth of animals has been known and made and worn in early civilizations. What has not been known is to manufacture jewelry from processed human deciduous dentition, as in the manner disclosed. The hardest thing in the human body is the enamel on the teeth. Like all mammals, humans have primary teeth and permanent teeth. Teeth begin being formed before birth.

Human teeth are very hard in order to withstand the grinding forces associated with chewing and crunching food. The hard material of the tooth is composed of calcium, phosphorus and other mineral salts. The material in the majority of the tooth is called dentine. The hard, shiny exterior layer is the enamel.

Teeth have two basic parts; a root to anchor the tooth to the w and a crown above the gum line. The section where the crown meets the root is called the neck. The root is covered with a hard material called cementum. At the center of each tooth is an area with nerves, arteries and veins called the dental pulp.

Humans have four different types of teeth, each with a different function: Incisors for cutting off bites of food; cuspids (with long sharp points) for tearing food; bicuspids (with two points) to tear and crush food; and molars with large, relatively flat surfaces to crush and grind food.

The four types of teeth together allow humans to be omnivores (eating both meat and vegetables). Most animals have more specialized teeth. Carnivorous (meat eating) animals have long sharp tearing teeth. Grazing animals, like cows and horses, have large flat teeth for grinding grass and other vegetation. Deciduous teeth are also known as the primary, baby, milk, or lacteal dentition.

The term deciduous means "to fall off." Although deciduous teeth are in time replaced by the succedaneous, or permanent, teeth, they are very important to the proper alignment, spacing and occlusion of the permanent teeth. The deciduous incisor teeth are functional in the mouth for approximately five years, while the deciduous molars are functional for approximately nine years. They therefore have considerable functional significance. The progressive loss of deciduous teeth are considered an important milestone in the developmental phase of childhood.

The event of baby tooth exfoliation is marked as a biological milestone and celebrated by a wide variety of traditions and customs around the world. In the United States, tradition is based on tales of the Tooth Fairy.

In the United States and elsewhere, it is common for parents to save, at least for a while, the exfoliated baby teeth of their children as a keepsake of their childhood and development. The typical storage means may be a small envelope or decorative box. One disadvantage of this method is that a small box filled with tiny teeth isn't significant as a keepsake, other than the origin of the teeth themselves.

Another disadvantage of storing deciduous teeth is that the collective individual teeth are easily lost or mixed up with the teeth of other children. Another disadvantage of storing deciduous teeth is their natural appearance upon exfoliation lacks the display appeal of photographs, toys, letters, drawings, and other memorabilia.

Recently, a new product category was introduced in which the naturally exfoliated baby teeth were processed and machined into the equivalents of gemstones. This was first introduced in U.S. Pat. Nos. 8,226,877, 8,661,849, and 9,364,993. This process proved to be difficult to perform for a number of reasons, solutions for which are disclosed and claimed in this disclosure.

A remaining difficulty in shaping exfoliated deciduous teeth into gem-like stones for jewelry is their very small size. The small size of deciduous teeth makes them extremely difficult to handle for cleaning, prepping or machining. A greater problem is that the small size of deciduous teeth requires an abnormally high yield rate from the manufacturing process to produce a gem-like "tooth stone" (filled and machined baby tooth) that is sufficiently large to be received in the bezel of the desired jewelry article.

Another difficulty in shaping exfoliated deciduous teeth into gem-like stones for jewelry is the need to preserve, without shaping, a selected display surface of the tooth. This difficultly arises from the fact that baby teeth are not homogeneous through their structure. They are non-homogeneous objects of complex structure with only a thin exterior layer of enamel. The enamel surface provides the beauty and durability of the baby tooth. The thinness of the enamel prevents shaping the display surface of the tooth.

A related difficulty in shaping exfoliated deciduous teeth into gem-like tooth stones for jewelry is the preference to reshape the perimeters of a baby tooth to fit in a rectangular jewelry bezel, such as a square bezel, while preserving the native enamel of the selected display surface of the baby tooth.

To attractively display the natural surface of a baby tooth, it is necessary to preserve, without machining, one surface (display surface) while positioning the machined surfaces inside a geometrically uniform bezel within an acceptable tolerance. The result is an uneven six-sided cube, with five perpendicular and flat surfaces, and one non-flat, non-uniform side, that is preserved in its native state to display the enamel surface.

Testing has shown that when mounted, the visual balance of the irregular surface is most noticeable at the upper bezel corners. These are the four corners of intersection between machined and unmachined surfaces. There is presently no known way to optimize the location of the machined planes of the non-uniform object, and to preserve the location for alignment or instruction to a machine.

It has proven to be difficult and time consuming to estimate where to machine the baby tooth for the best appearance for mounting in a conventional "square" bezel. There is no certain way of optimizing the alignment, and misalignment results in the appearance of a poor quality product. The misalignment commonly manifests itself as one or more "low corners," "high corners" or combinations of both when mounted in the bezel. This is not a phenomena the public has seen before in jewelry. The result is a substantially diminished value of the final product.

The unique problem occurs because it is not possible to align a rectangular plane of fixed dimensions (that of the bezel) to a non-uniform surface and assure contact of all four corners with the unmachined surface. From this problem, it is observed that three points always define a plane, whereas four points at a fixed distance very likely may not.

Another difficulty is in mounting the baby tooth on a surface to machine. It was found that waxing the baby tooth to a glass slide provided an efficient and easy way to secure the baby tooth to a fixture for machining. However, it was also found that the wax, when heated sufficiently to reach a liquid state for securing the baby tooth to the glass slide, would flow as a result of thermal planes in the wax itself. This, in turn, make it difficult to hold the tooth in a desirable position.

Another difficulty arises in that placing the desired display side of the baby tooth against a flat glass surface fails to predict how well the surfaces and corners of the machined baby tooth, or tooth stone, will match with that of the bezel.

Thus, there remains a need to reliably and efficiently optimize the orientation and location of the five surfaces of the baby tooth to be machined in relation to the non-uniform displayed surface of a baby tooth, such that the non-uniform display surface will align closely to the corners of the tooth stone with the bezel of the jewelry article.

SUMMARY

As used herein, the terms "dentition," "deciduous dentition," "deciduous teeth," "primary teeth," "milk teeth," "baby tooth," and "baby teeth," are used interchangeably to refer to one or more human primary teeth.

As used herein, the terms "succedaneous teeth," "permanent dentition," "permanent teeth," "secondary teeth," and "adult teeth," are used interchangeably to refer to one or more human secondary teeth.

As used herein, the term "exfoliated" refers to the natural loss of baby teeth after the loss of their root structure.

As used herein, the terms "disinfected" and "decontaminated" are used interchangeably to refer to the cleansing and removal of microorganisms from the tooth, but not necessarily compete sterilization.

As used herein, the terms "substantial" and "substantially" mean mostly.

As used herein, the term "bonding agent" refers to the broad category of such bonding agents, and may include one of, or a combination of, dental cements, dental adhesives, dental composites, and non-dental epoxies, fillers, adhesives, and glues.

As used herein, the terms "jewelry frame," and "jewelry framework" are used interchangeably, and include "bezels" of the type used to hold gemstones, which may be an integral part of the jewelry frame, or that may be separately connected or movably attached to the jewelry frame.

The history of jewelry is as old as the history of man. Styles and trends come and go and come again. What is not found in this history is any event of persons wearing their deciduous teeth, or that of their descendants, in the form of jewelry. While the notion sounds unusual and contrary to conventional jewelry products to some, jewelry made from baby teeth in accordance with the teachings of this and other patents has proven to be a beautiful and unique symbol of the great devotion many parents have for their children. The product transcends the relevance of jewelry worn merely for personal adornment or expression of social status into the category of items worn as expressions of beliefs, devotions, or achievements, such as when a Christian wears a cross, a Jew wears a Star of David, a college graduate a class ring, or when a veteran wears a military medal, or other implement of nationalism.

An advantage of the disclosed embodiments is that they provide a means of manufacturing jewelry items from baby teeth that overcome the several difficulties presented by the small size and non-uniform geometry of stones and baby teeth.

Another advantage of the disclosed embodiments is that they provide a means for optimizing the location for the shaped surfaces of the baby tooth for complementary fit in a rectangular bezel of fixed dimensions. Another advantage of the disclosed embodiments is that they provide a means for determining the sufficiency of the size of a baby tooth for a particular jewelry article. Another advantage of the disclosed embodiments is that they provide a structure for complementary fit in tool holders designed to receive it.

Another advantage of the disclosed embodiments is that they increase the quality of the mounting of the shaped baby teeth for fitting into jewelry articles. Another advantage of the disclosed embodiments is that they reduce the subjective and visual constraints associated with manually estimating alignment of baby teeth for machining for fitting into jewelry articles.

Other advantages of the disclosed method will become apparent from the following descriptions, taken in connection with the accompanying drawings, wherein, by way of illustration and example, embodiments of the disclosed method are disclosed.

In one embodiment of the disclosed method, a baby tooth, or primary tooth of a child is provided. The baby tooth is disinfected and the pulp cavity evacuated. The pulp cavity is filled with a bonding/cementing agent and cured until solidified.

A display side of the baby tooth is selected. In one embodiment, the baby tooth is secured, such as by casting or other method, to a tool setting with the display side uncovered and accessible and optimally centered and balanced as to contact with four corners spaced by the amount of the four corners of the bezel into which it will be set.

In one embodiment, a center-cast tool for casting a non-uniform object is provided. The center-east tool has a body having a top side and an opposite bottom side, and a left side and opposite right side. A casting bay is recessed into the top side of the body. A base forms the bottom of the casting bay.

A first aperture and a second aperture extend through the base and the bottom side. The second aperture intersects the first aperture in perpendicular orientation to form an aperture intersection. The aperture intersection forms four opposing right angles on the base at the center of the bay.

In another embodiment, a first release hole extends through the base and the bottom side on a first side of the aperture intersection. In another embodiment, a second release hole extends through the base and the bottom side on a second side of the aperture intersection.

In another embodiment, the distance between adjacent right angles in the base is equal to the length of each side of the bezel of a jewelry article into which the finish machined irregular object will be set.

In another embodiment, the width of the first and second apertures is equal to the length of each side of the bezel of a jewelry article into which the finish machined Irregular object will be set.

In another embodiment, the first and second apertures are longitudinal in shape. In another embodiment, a left arm extends from the left side of the body, and a right arm extends from the right side of the body.

In another embodiment, a method of manufacturing an irregularly shaped object with the above described center-cast tool is disclosed. In this embodiment, a transparent adhesive tape is attached to the bottom side of the body so as to cover the first and second apertures. A display side of the irregular object is selected. The irregular object is positioned over the aperture intersection such that the display side is in contact or near contact with all four of the right angles on the base.

The display side is secured to the adhesive tape at the aperture intersection. The bay is filled with a solidifying casting material. The casting material is allowed to solidify around the irregular object. The solidified casting and irregular object are then removed from the bay for further processing, such as shaping.

In another embodiment, a first release hole is provided extending through the base and the bottom side on a first side of the aperture intersection. A tool, such as a punch, is inserted into the first release hole to press the solidified casting material free from the bay of the center-cast tool.

In another embodiment, a left arm is provided to extend from the left side of the body. A right arm is provided to extend from the right side of the body. An elastic band is extended between the left and right arms in tension such that the elastic band presses the irregular object against the opposing right angles of the base, securing it in place to prevent movement away from the selected position of the irregularly shaped object.

In another embodiment, the removed solid casting has a display side associated with the side of the casting that was in contact with the base of the bay. The solid casting has an off display side associated with the side opposite to the display side. The display side of the solid casting has extensions formed where the casting material filled the first and second apertures. The display side is located in a fixture configured to receive the display side of the solid casting, and the off display side is ground to the thickness desired for mounting in a bezel of a jewelry article.

In another embodiment, the display side has extensions formed where the casting material filled the first and second apertures. The off display side is located in a fixture configured to receive the off display side of the solid casting. The solid casting and irregular object are saw cut along lines adjacent to extensions of the solid casting.

In another embodiment, the irregularly shaped object is a baby tooth.

BRIEF DESCRIPTION OF THE DRAWINGS

The drawings constitute a part of this specification and include exemplary embodiments to the disclosed method, which may be embodied in various forms. It is to be understood that, in some instances, various aspects of the disclosed method may be shown exaggerated, enlarged or otherwise spatially modified to facilitate an understanding of the disclosed method.

DETAILED DESCRIPTION

The following description is presented to enable any person skilled in the art to make and use the disclosed method, and is provided in the context of a particular application and its requirements. Various modifications to the disclosed embodiments will be readily apparent to those skilled in the art, and the general principles defined herein may be applied to other embodiments and applications without departing from the spirit and scope of the disclosed method. Thus, the disclosed method is not intended to be limited to the embodiments shown, but is to be accorded the widest scope consistent with the principles and features disclosed herein.

Figure 1:
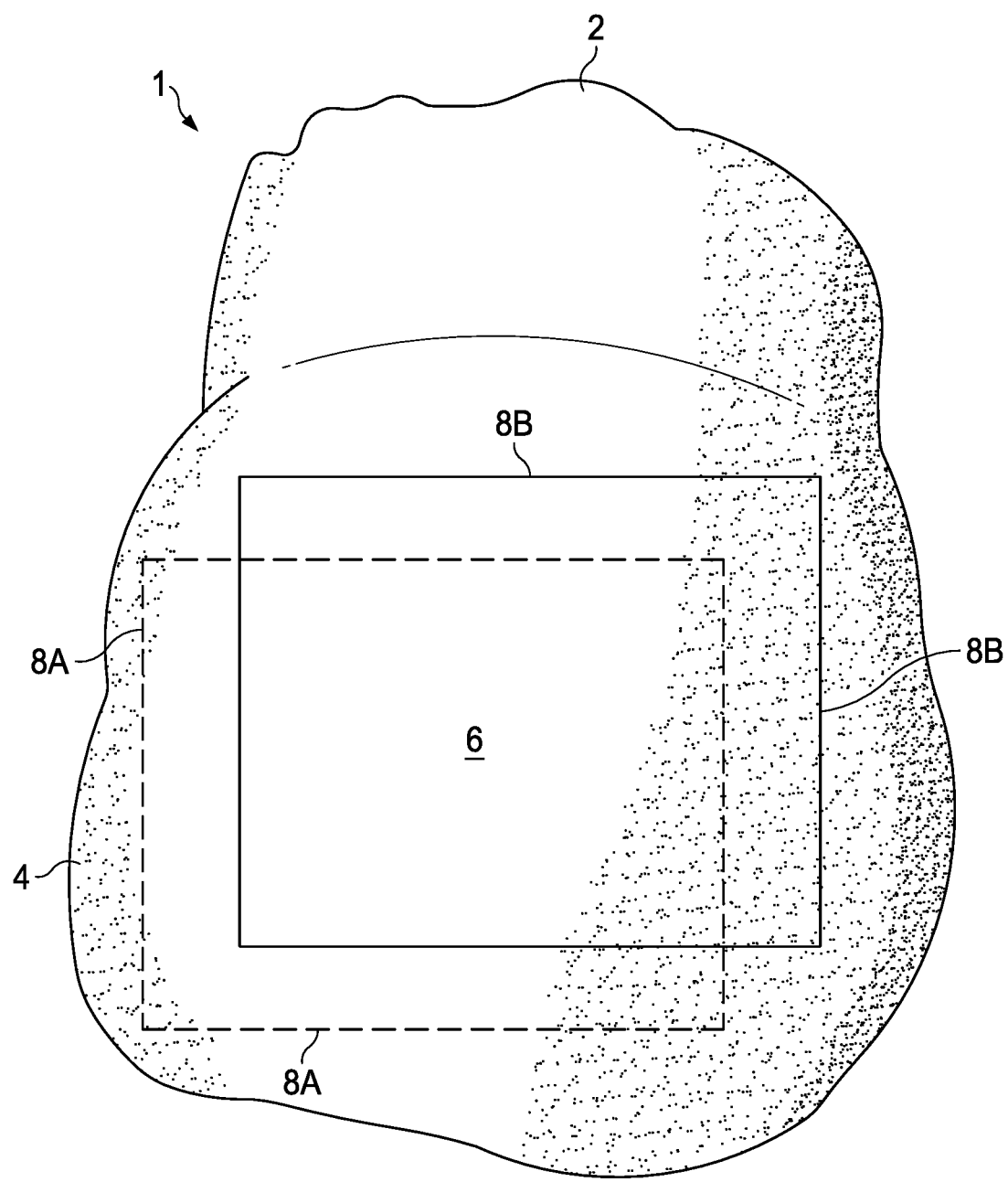
FIG. 1 is a digital scan of an exfoliated deciduous tooth, uploaded to viewing software, such as a CAD system.

FIG. 1 is a three dimensional digital n of an exfoliated deciduous tooth 1. Tooth 1 is a cuspid in this example, but the device and methods disclosed herein are equally useful for any other tooth, or any other irregularly shaped object where it is desired to preserve one natural surface as against 5 perpendicular surfaces. In this view, it is seen that there is a neck portion 2 and a facial surface 4. A display surface 6 has been selected as the facial surface 4 of this baby tooth 1.

A plurality of squares 8, including 8A and 8B have been superimposed on display side 6 to demonstrate the multiplicity of options for machining tooth 1 to a size sufficient to fit inside a bezel of a selected jewelry article. However, the various squares 8 do not advise the machinist/jeweler as to which choice will provide a finish product in which the corners of the tooth 1 will match the height of the bezel into which it is mounted. It has been determined that this has a big impact on the quality of the appearance of the final product.

For example, machining along square 8A may result in one or more corners of the surface of display side 6 being lower or higher than the other corners. In this instance, machining at 8B provides a superior result.

Figure 2:
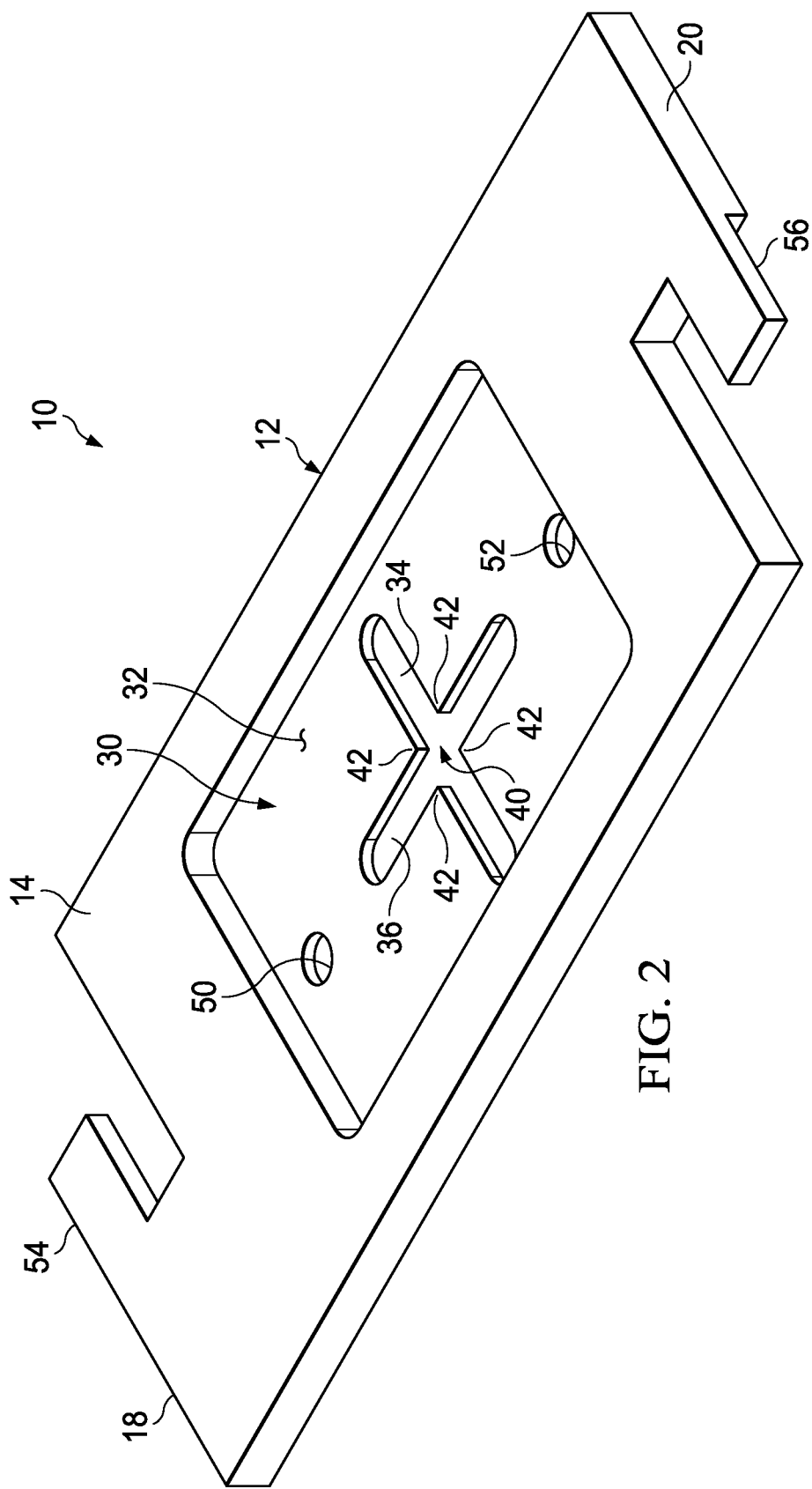
FIG. 2 is a top isometric view of a center-cast tool illustrative various embodiments of the present disclosure.
Figure 3:
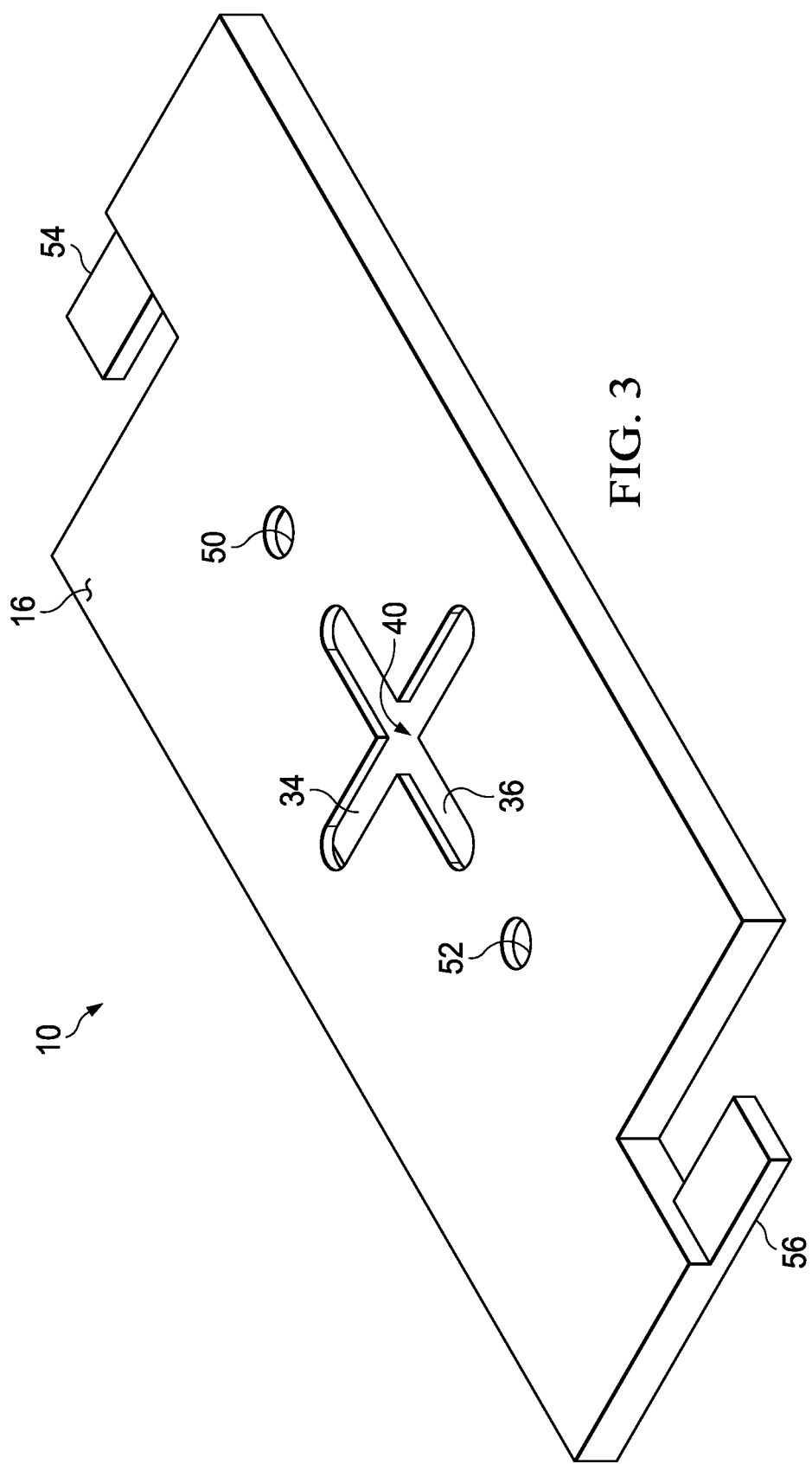
FIG. 3 is a bottom isometric view of the center-cast tool of FIG. 2.

FIG. 2 is a top isometric view of a center-cast tool illustrating various embodiments of the present disclosure. FIG. 3 is a bottom isometric view of the center-cast tool of FIG. 2. The description below refers to both FIGS. 2 and 3.

A center-cast tool 10 is provided. Center-cast tool 10 has a body 12 having a top side 14 and an opposite bottom side 16 (see FIG. 3). Center-cast tool 10 has a left side 18 and opposite right side 20. Referring to FIG. 2, a casting bay 30 is recessed into top side 14 of body 12. A base 32 forms the bottom of the casting bay 30.

A first aperture 34 and second aperture 36 extend through base 32 and bottom side 16. Second aperture 36 intersects first aperture 34 in perpendicular orientation to form an aperture intersection 40. Aperture intersection 40 forms four opposing right angles 42 (see FIG. 2) on base 32 at the center of bay 30.

In another embodiment, a first release hole 50 extends through base 32 and bottom side 16 between aperture intersection 40 and left side 18. In another embodiment, a second release hole 52 extends through base 32 and bottom side 16 between aperture intersection 40 and right side 20.

In another embodiment, the distance between adjacent right angles 42 in base 32 is equal to the length of each side of the bezel of a jewelry article into which the finish machined irregular object (tooth 1) will be set (not shown).

In another embodiment, the width of first and second apertures 34 and 36 are equal to the length of each side of the bezel of a jewelry article into which the finish machined irregular object will be set (not shown).

In another embodiment, first and second apertures 34 and 36 are longitudinal in shape. In another embodiment, a left arm 54 extends from left side 18 of body 12, and a right arm 56 extends from right side 20 of body 12.

In another embodiment, a method of manufacturing an irregularly shaped object with the above described center-cast tool 10 is disclosed. In this embodiment, a transparent adhesive tape 60 (not shown) is attached to bottom side 16 of body 12 so as to cover first and second apertures 34 and 36, and also first and second release holes 50 and 52 if provided. Display side 6 of tooth 1 is selected. Tooth 1 is positioned over aperture intersection 40 such that display side 6 is in contact or near contact with all four of the right angles 42 on base 32.

Display side 6 is secured to adhesive tape 60 at aperture intersection 40. Bay 30 is filled with a solidifying casting material, such as a polymer resin or other suitable material. The casting material is allowed to solidify around the irregular object—baby tooth 1. The solidified casting 70 and baby tooth 1 are then removed from bay 30 for further processing, such as shaping.

In another embodiment, adhesive tape 60 is removed and a tool, such as a punch, is inserted into first release hole 50 and second release hole 52 to press solidified casting 70 free from bay 30 of center-cast tool 10.

In another embodiment, an elastic band 62 (rubber band—not shown) is extended between the left and right arms 54 and 56 in tension such that elastic band 62 presses tooth 1 against opposing right angles 42 of base 32, securing tooth 1 in place to prevent movement away from the selected position of tooth 1.

In another embodiment, solid casting 70 has a display side 72 associated with the side of the casting that was in contact with base 32 of bay 30. Solid casting has an off display side 74 associated with the side opposite to display side 72. Display side 72 of solid casting 70 has extensions 76 formed where the casting material filled first and second apertures 34 and 36. Display side 72 is located in a fixture 100 (not shown) configured to receive display side 72 of solid casting 70, and off display side 74 is ground to the thickness desired for mounting in a bezel of a jewelry article.

In another embodiment, off display side 74 is located in a fixture 200 (not shown) configured to receive off display side 74 of solid casting 70. Solid casting 70 and baby tooth 1 are saw cut along lines adjacent to extensions 76 on display side 72 of solid casting 70.

As used in the examples of the functionality of the embodiments disclosed, the irregularly shaped object is baby tooth 1. It will be appreciated by a person of ordinary skill that the utility of the devices and methods of this disclosure are not limited to the centering, casting, and machining of baby teeth, but may also apply to gemstones.

It will be understood by one of ordinary skill in the art that the disclosures related to the various figures and embodiments can be mixed and matched to obtain desired results.

While this invention has been described in connection with a one embodiment, it is not intended to limit the scope of disclosed method to the particular form set forth, but, on the contrary, is intended to cover such alternatives, modifications and equivalents as may be included within the spirit and scope of disclosed method as defined by the appended claims.

I claim:

1. A center-cast tool for casting a non-uniform object, comprising:
   a body;
   the body having a top side and an opposite bottom side;
   the body having a left side and an opposite right side;
   a casting bay recessed into the top side of the body;
   a base at the bottom of the casting bay;
   a first aperture extending through the base and the bottom side and having a width;
   a second aperture extending through the base and the bottom side and having a width;
   the second aperture intersecting the first aperture in perpendicular orientation to form an aperture intersection; and,
   the aperture intersection forming four opposing right angles on the base.

2. The center-cast tool of claim 1, further comprising:
   the aperture intersection being centered in the bay.

3. The center-cast tool of claim 1, further comprising:
   the distance between all adjacent right angles at the aperture intersection are equal.

4. The center-cast tool of claim 1, further comprising:
   the width of the first and second apertures are equal.

5. The center-cast tool of claim 1, further comprising:
   a first release hole extending through the base and the bottom side on a first side of the aperture intersection.

6. The center-cast tool of claim 1, further comprising:
   a second release hole extending through the base and the bottom side on a second side of the aperture intersection.

7. The center-cast tool of claim 1, further comprising:
   a left arm extending from the left side of the body; and,
   a right arm extending from the right side of the body.

8. The center-cast tool of claim 1, further comprising:
   the first and second apertures being longitudinal in shape.

9. A method of manufacturing an irregularly shaped object, comprising:
   providing the center-cast tool of claim 1;
   attaching a transparent adhesive tape to the bottom side of the body so as to cover the first and second apertures;
   selecting a display side of the irregular object;
   positioning the irregular object over the aperture intersection such that the display side is in contact or near contact with all four of the right angles on the base;
   securing the display side to the adhesive tape at the aperture intersection;
   filling the bay with a solidifying casting material;
   allowing the casting material to solidify around the irregular object; and,
   removing the solidified casting and irregular object from the bay for further processing.

10. The method of manufacturing an irregularly shaped object of claim 9, comprising:
providing a first release hole extending through the base and the bottom side on a first side of the aperture intersection; and,
pressing the casting out through the first release hole.

11. The method of manufacturing an irregularly shaped object of claim 9, comprising:
providing a left arm extending from the left side of the body;
providing a right arm extending from the right side of the body; and,
extending an elastic band between the left and right arms in tension such that the elastic band presses the irregular object against the opposing right angles of the base.

12. The method of manufacturing an irregularly shaped object of claim 9, comprising:
the solid casting having a casting display side associated with the side of the casting that was in contact with the base of the bay;
the solid casting having a casting off display side associated with the side opposite to the display side;
the casting display side having perpendicular extensions formed where the casting material filled the first and second apertures;
locating the display side in a fixture configured to receive the display side of the solid casting; and,
grinding the off display side to the thickness desired for mounting in a bezel of a jewelry article.

13. The method of manufacturing an irregularly shaped object of claim 9, comprising:
the solid casting having a casting display side associated with the side of the casting that was in contact with the base of the bay;
the solid casting having a casting off display side associated with the side opposite to the display side;
the display side having extensions formed where the casting material filled the first and second apertures;
locating the off display side in a fixture configured to receive the off display side of the solid casting; and,
sawing through the solid casting adjacent to the extensions of the solid casting.

14. The method of claim 9, further comprising:
the irregularly shaped object being a baby tooth.

* * * * *